US010101799B2

United States Patent
Huang et al.

(10) Patent No.: US 10,101,799 B2
(45) Date of Patent: Oct. 16, 2018

(54) SYSTEM AND METHOD FOR SMART POWER CLAMPING OF A REDUNDANT POWER SUPPLY

(71) Applicant: Quanta Computer Inc., Taoyuan (TW)

(72) Inventors: Jen-Hsuen Huang, Taoyuan (TW); Fa-Da Lin, Taoyuan (TW); Chih-Wei Yu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 6 days.

(21) Appl. No.: 15/206,115

(22) Filed: Jul. 8, 2016

(65) Prior Publication Data

US 2017/0285728 A1   Oct. 5, 2017

Related U.S. Application Data

(60) Provisional application No. 62/317,209, filed on Apr. 1, 2016.

(51) Int. Cl.
*G06F 11/00* (2006.01)
*G06F 1/32* (2006.01)
*G06F 11/20* (2006.01)
*G06F 1/30* (2006.01)

(52) U.S. Cl.
CPC .............. *G06F 1/3287* (2013.01); *G06F 1/30* (2013.01); *G06F 1/3206* (2013.01);
(Continued)

(58) Field of Classification Search
CPC ........ G06F 1/3287; G06F 1/30; G06F 1/3206; G06F 1/3243; G06F 1/3246;
(Continued)

(56) References Cited

U.S. PATENT DOCUMENTS

| 2004/0158771 A1* | 8/2004 | Garnett ................... G06F 1/263 714/14 |
| 2006/0161794 A1* | 7/2006 | Chiasson .................. G06F 1/28 713/300 |
| 2007/0150757 A1* | 6/2007 | Aldereguia ........... G06F 1/3209 713/300 |

(Continued)

FOREIGN PATENT DOCUMENTS

| JP | 2014151873 A | 8/2014 |
| JP | 2015148914 A | 8/2015 |

OTHER PUBLICATIONS

Extended European Search Report for EP Application No. 17162277.2, dated Jul. 28, 2017.
(Continued)

*Primary Examiner* — Jason B Bryan
(74) *Attorney, Agent, or Firm* — Nixon Peabody LLP; Eduardo J. Quiñones (57) ABSTRACT

Systems, methods, and non-transitory computer-readable storage media for smart power clamping of a redundant power supply. A system configured according to this disclosure can measure, at a baseboard management controller, a system power consumption which indicates total power being delivered by a first power supply unit and a second power supply unit. The system can determine that the system power consumption exceeds a system power consumption capacity and, in response to the determination, communicate a power clamping signal to a processor, resulting in a reduced system power consumption. The system can further identify that the reduced system power consumption exceeds the system power consumption capacity and initiate a hardware throttling of at least one of the first power supply unit and the second power supply unit.

14 Claims, 5 Drawing Sheets

(52) U.S. Cl.
CPC .......... *G06F 1/3243* (2013.01); *G06F 1/3246* (2013.01); *G06F 11/2015* (2013.01); *G06F 2201/805* (2013.01); *G06F 2201/81* (2013.01); *Y02D 10/152* (2018.01); *Y02D 10/171* (2018.01)

(58) Field of Classification Search
CPC .......... G06F 11/2015; G06F 2201/805; G06F 2201/81; Y02D 10/171
See application file for complete search history.

(56) References Cited

U.S. PATENT DOCUMENTS

| | | |
|---|---|---|
| 2008/0168287 A1* | 7/2008 | Berry .................. G06F 1/266 713/323 |
| 2014/0006818 A1 | 1/2014 | Doshi et al. |
| 2015/0177813 A1 | 6/2015 | Bailey et al. |
| 2016/0026549 A1* | 1/2016 | Alshinnawi ......... G06F 11/2015 714/14 |
| 2017/0147060 A1* | 5/2017 | Chen .................. G06F 1/263 |

OTHER PUBLICATIONS

Patki,T., et al; Exploring Hardware Overprovisioning in Power-Constrained, High Performance Computing, International Conference on Supercomputing, Jun. 10-14, 2013; 12 pgs., Eugene, OR, United States.

JP Office Action for Application No. 2017-044536, dated Jun. 4, 2018, w/ First Office Action Summary.

\* cited by examiner

SYSTEM AND METHOD FOR SMART POWER CLAMPING OF A REDUNDANT POWER SUPPLY

PRIORITY

The present application claims priority to U.S. Provisional Patent Application 62/317,209, filed Apr. 1, 2016, the contents of which are incorporated herein by reference in their entirety.

BACKGROUND

1. Technical Field

The present disclosure relates to power clamping and more specifically to smoothly decreasing system power when a power source is insufficient to support the system power required.

2. Introduction

Because power supplies sometimes fail, redundant or backup power supplies are often used to provide consistent power. However, traditional power supply redundancy can result in system lag (i.e., leaving users with the illusion of the system hanging) and can damage the operating power supplies. For example, systems which rely on backup power supplies may experience a power supply failure, where the backup unit requires a period of time (seconds to minutes) before being able to provide the necessary power. During the period of time before necessary backups are completely online, the power supplies which have remained online can be taxed beyond their capabilities, resulting in damage to the power supply units. In addition, the remaining power supplies might be incapable of producing the total amount of power being requested, such that users have reduced functionality or lag.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for smart power clamping of a redundant power supply. The disclosed smart power clamping results in an improvement in a power decrease such that lag is less perceptible and damage to still operational power supplies can be reduced. More specifically, systems configured according to this disclosure can provide smart power clamping by using a combination of software and hardware clamping, thereby reducing power requirements. For example, a system configured according to this disclosure can measure, at a management controller, a system power consumption which indicates total power being delivered by a first power supply unit and a second power supply unit. The system can determine that the system power consumption exceeds a system power consumption capacity and, in response to the determination, communicate a power clamping signal to at least one processor, resulting in a reduced system power consumption. The system can further identify that the reduced system power consumption exceeds the system power consumption capacity and initiate a hardware throttling of at least one of the first power supply unit and the second power supply unit.

DETAILED DESCRIPTION

A system, method and computer-readable media are disclosed which result in improved power clamping of power supply units, resulting in reduced damage to power supply units and reduced perception of system lag. Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts is disclosed herein. A more detailed description of smart power clamping will then follow, accompanied by exemplary embodiments. The disclosure now turns to FIG. 1.

Figure 1:
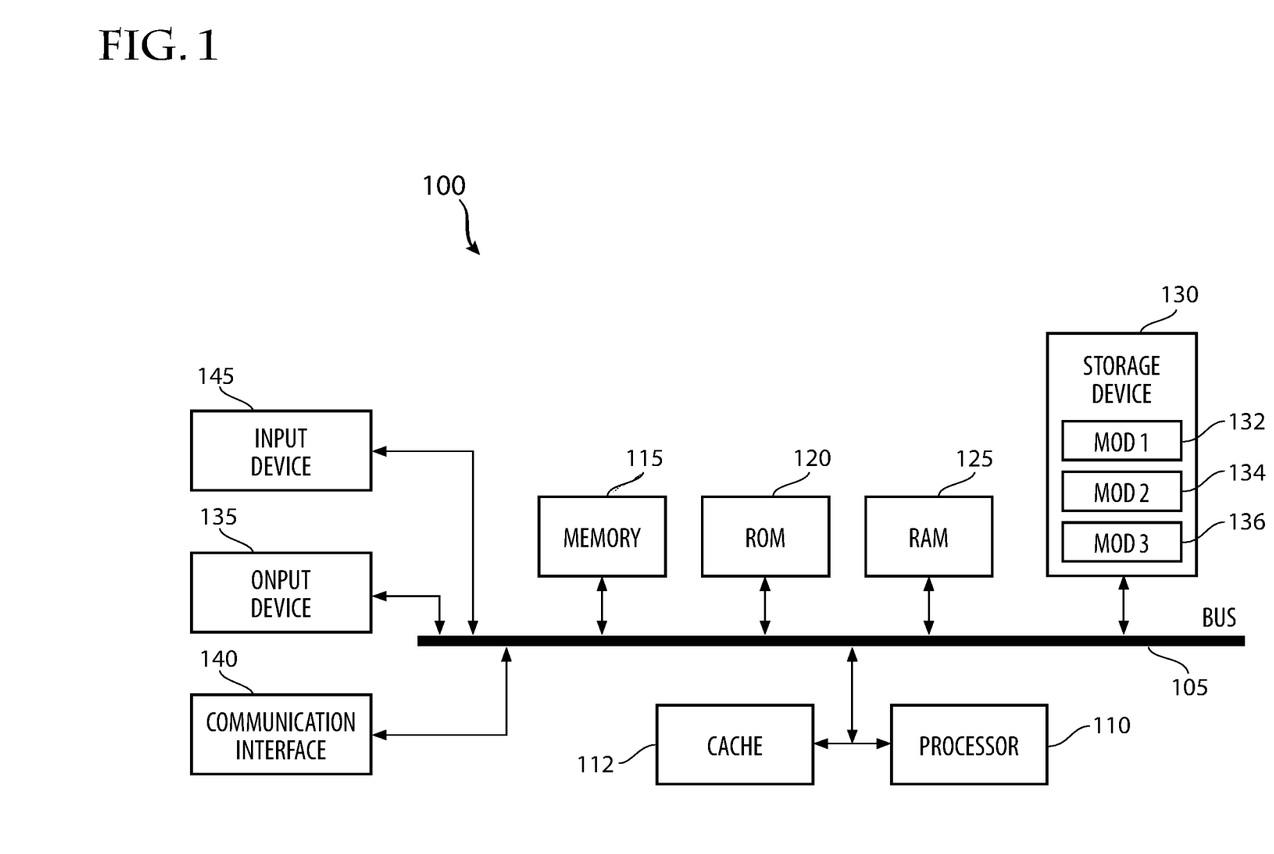
FIG. 1 illustrates an example system embodiment.

With reference to FIG. 1, an exemplary system 100 includes a general-purpose computing device, including a processing unit (CPU or processor) 110 and a system bus 105 that couples various system components including the system memory 115 such as read only memory (ROM) 120 and random access memory (RAM) 125 to the processor 110. The system 100 can include a cache 112 of high speed memory connected directly with, in close proximity to, or integrated as part of the processor 110. The system 100 copies data from the memory 115 and/or the storage device 130 to the cache 112 for quick access by the processor 110. In this way, the cache provides a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

The system bus 105 may be any of several types of bus structures including a memory bus or memory controller, a peripheral bus, and a local bus using any of a variety of bus architectures. A basic input/output (BIOS) stored in ROM 120 or the like, may provide the basic routine that helps to transfer information between elements within the computing device 100, such as during start-up. The computing device 100 further includes storage devices 130 such as a hard disk drive, a magnetic disk drive, an optical disk drive, or tape drive. The storage device 130 can include software modules 132, 134, 136 for controlling the processor 110. Other hardware or software modules are contemplated. The storage device 130 is connected to the system bus 105 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 110, bus 105, display 135, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 130, other types of computer-readable media which can store data that are accessible by a computer, such as magnetic cassettes, flash memory cards, digital versatile disks, cartridges, random access memories (RAMS) 125, and read only memory (ROM) 120, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 may be provided by a single shared processor or multiple processors. Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

Figure 2:
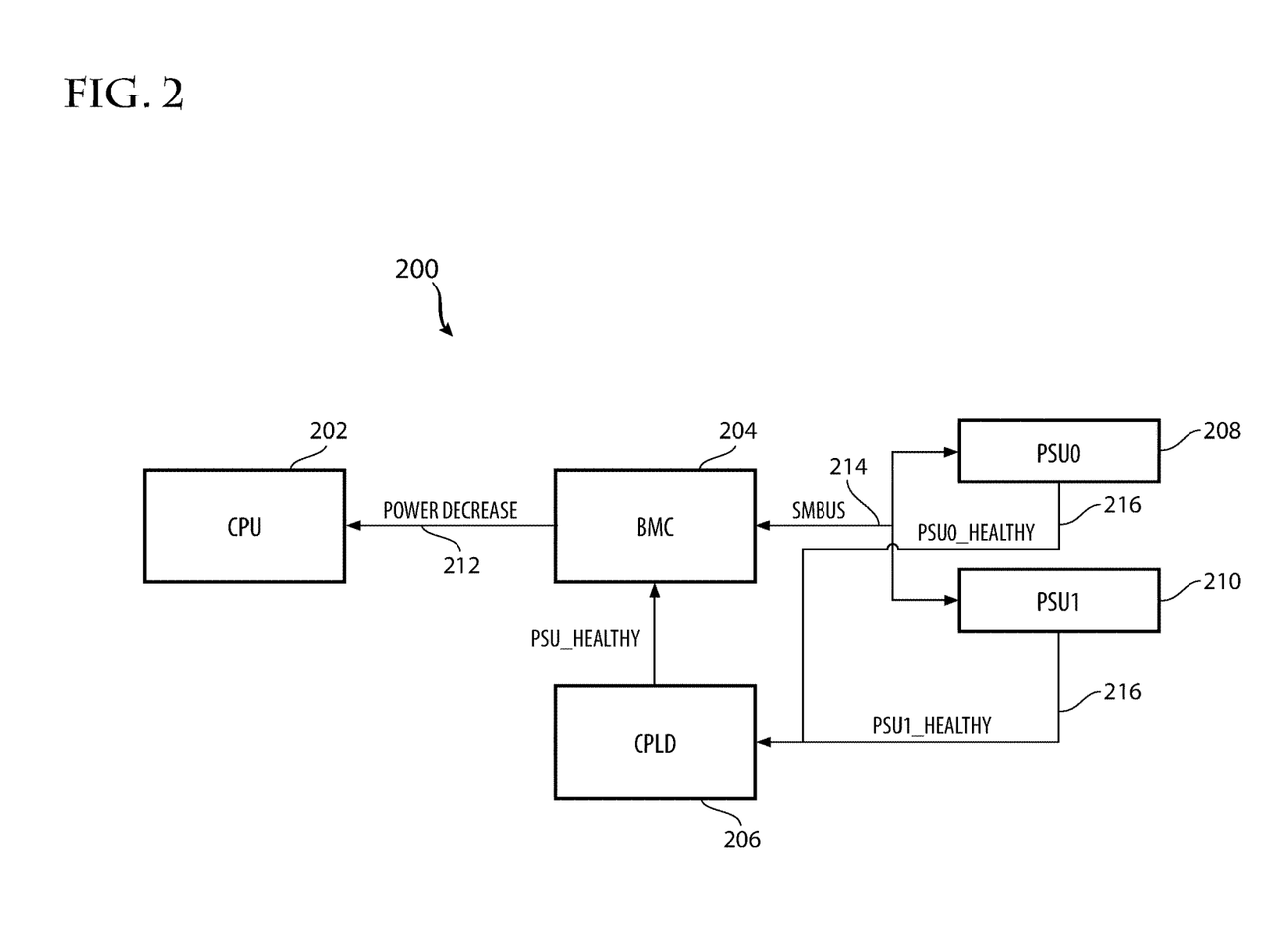
FIG. 2 illustrates an exemplary system architecture.

Having disclosed some components of a computing system, the disclosure now turns to FIG. 2, which illustrates an exemplary system architecture 200. In this example, a system is using multiple power supply units: PSU0 208 and PSU1 210. Each of these power supply units 208, 210 communicates information regarding health/status of the respective power supply unit to a CPLD (Complex Programmable Logic Device) 206 via respective signal lines 216. The CPLD 206 communicates the status of the power supply units to a BMC (Baseboard Management Controller) 204, which is also in communication with the respective power supplies 208, 210 using a SMBUS (System Management Bus) 214. While the BMC 204 is illustrated as interacting with the power supply units 208, 210, in other configurations the monitoring of the power supply units can be performed directly by the processor 202, or by a separate (i.e., not physically co-located) management controller. For example, if the role of the management controller is being filled by the CPU 202, the management controller could be a set of logic functions with the processing unit with corresponding input/output pins. Similarly, the role of the CPLD 206 illustrated can, in other embodiments, be fulfilled by either a management controller, a CPU 202, or other processing device The CPLD 206, for example, receives updates from PSUs indicating the "health" of the individual PSU (i.e., the ability to continue performing designated functions). Exemplary PUS healthy signals can include: a signal indicating the Direct Current of the PSS is OK (i.e., DC_OK), a signal indicating Alternating Current of the PSU is OK (i.e, AC_OK), a signal indicating the PSU is sending out alerts (such as ALERT#), etc. The BMC 204, via the SMBUS 214, can, for example, increase or decrease the amount of power being output by the respective power supplies 208, 210. The BMC 204 also communicates with a system CPU (Computer Processing Unit) 202. For example, the BMC 204 can cause the CPU 202 to use less power by sending a "power decrease" signal 212.

Figure 3:
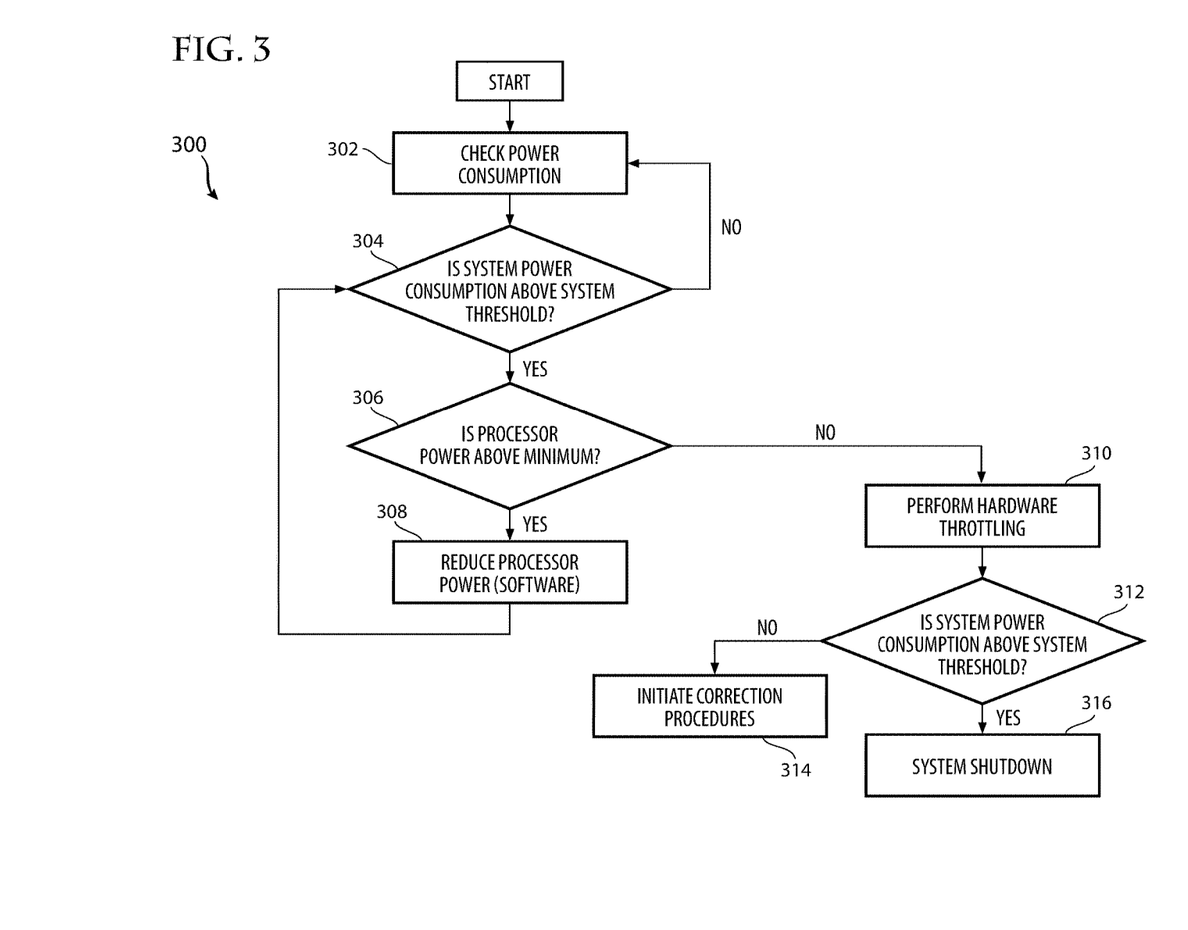
FIG. 3 illustrates a first exemplary flowchart of system processes.

FIG. 3 illustrates a first exemplary flowchart of system processes 300. The exemplary processes illustrated in FIG.

3 can, for example, be performed by the BMC 204 of FIG. 2, or by other processing devices. For the sake of clarity, the method is described in terms of an exemplary system 100 as shown in FIG. 1 configured to practice the processes illustrated. The steps outlined herein are exemplary and can be implemented in any combination thereof, including combinations that exclude, add, or modify certain steps.

The system 100 checks system power consumption 302 and compares the system power consumption to a system threshold 304. If the system power consumption is below the threshold, the system 100 repeats the process of checking power levels against the threshold 302, 304. If the system power consumption is above the system threshold, the system 100 begins procedures designed to reduce the overall system power consumption to below the system power threshold.

First, the system 100 determines if the processor power (power being directed to a CPU, BMC, and/or other system processor) is above a minimum processor power level 306. If the processor power is above the minimum processor power threshold, the system 100 reduces the processor power level 308, thereby reducing the overall system power consumption via a software solution. This lowering of system power by reducing the power directed to the processor(s) can iteratively repeat while the power being directed to the processor remains above a threshold level. If the processor power consumption is at or below a threshold processor power level, the system 100 moves to perform a physical/hardware throttling of power 310. This can, for example, utilize switches, turning off components, or otherwise physically eliminating power consumption within the system 100. The hardware throttling 310 can be a single instance, or can involve layers of hardware throttling options which can be performed iteratively, with checks on the system power consumption occurring between iterations. After performing the hardware throttling, the system 100 performs another check to see if the system power consumption is above the system threshold 312. If so, the system 100 can initiate a system shutdown 316, whereas if the power consumption is no longer above the power consumption threshold the system 100 can initiate correction procedures 314. The correction procedures can include turning on lights/communicating error messages, outputting sounds/alarms indicating failure, sending emails, and/or waiting a period of time before restoring power to the processor and/or hardware components.

Figure 4:
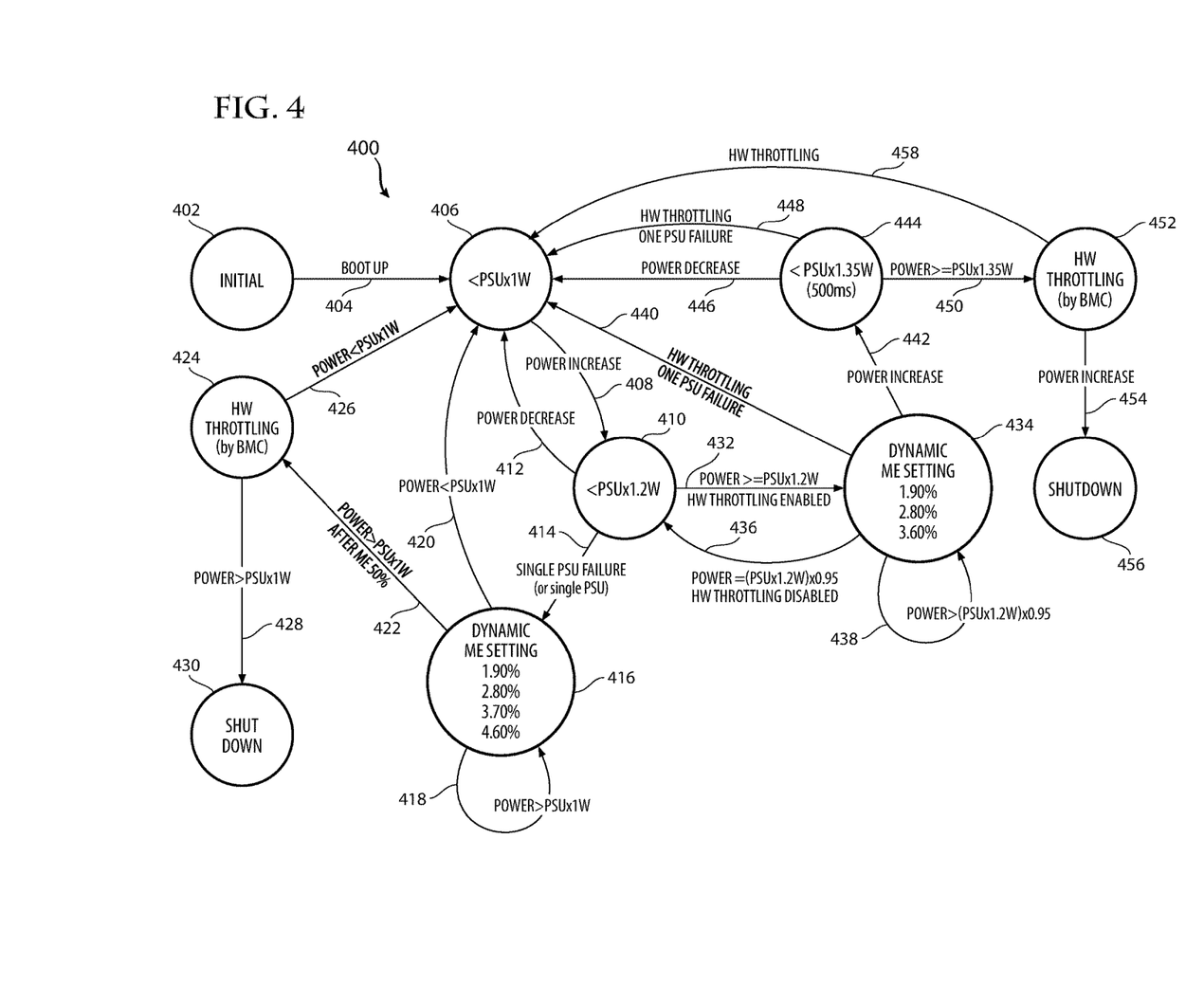
FIG. 4 illustrates a second exemplary flowchart of system processes.

FIG. 4 illustrates a second exemplary flowchart of system processes 400. While FIG. 3 illustrates a generalized flowchart of system processes, the flowchart of FIG. 4 is more complex, showing one possible system implementation of the concepts disclosed herein while still applying the principles illustrated in FIG. 3. As with FIG. 3, for the sake of clarity, the processes are described in terms of an exemplary system 100 as shown in FIG. 1 configured to practice the method. The steps outlined herein are exemplary and can be implemented in any combination thereof, including combinations that exclude, add, or modify certain steps. Within FIG. 4, there are three general areas of flow to consider: (1) On the left portion, where power is at or below normal (<PSU×1 W 406) to slightly above normal (<PSU×1.2 W 410) to software throttling 416 to hardware throttling 424; (2) In the middle, where power is at or below normal (<PSU×1 W 406) to slightly above normal (<PSU×1.2 W 410) to software throttling 434; and (3) On the right portion, where software throttling 434 has not sufficiently dropped power, resulting in power over 35% capacity 444 and resulting hardware throttling 452. With this broad understanding of FIG. 4, we walk through FIG. 4.

The system 100 can start in a standby condition. Upon receiving instructions to begin or initialize 402, the system 100 boots up 404. After boot up 404, the system 100 starts to operate, and a processing device such as a BMC monitors power consumption and makes determinations following the illustrated procedures. For this example, we assume that one PSU can support a defined amount of power, designated PSU×1 W. (e.g., 2200 W). When the system power is below PSU×1 W 406, the system 100 takes no action. If power consumption is between PSU×1 W 406 and PSU×1.2 W 410 (e.g., <2640 W) (because the power is going up 408 or going down 412), the system 100 takes no action until a PSU fails.

Failure of a PSU can, however, trigger the left portion of the flow chart, with software throttling of the CPU 416 and possible hardware throttling 424. When a PSU fails 414 (for example, the PSU is broken or the plug comes out), and power is over PSU×1 W, the BMC informs the CPU to start power clamping 416 (by reducing processor power as described in FIG. 3). First, the BMC indicates the CPU should set the CPU power to 90%, at which point the BMC will check the system power consumption. If the power consumption remains greater than PSU×1 W 418 (i.e., if the system power is above what the system can currently provide with the remaining power supply units), the BMC iteratively informs the CPU to power down additional percentages 416. Once the system power consumption is lower than PSU×1 W or another PSU is plugged in, the BMC releases the power clamping and the CPU can return to normal operation. If, however, the CPU reaches a minimal amount of power (i.e., 50%) and the system power consumption is still greater than PSU×1 W 422, the system 100 can initiate a hardware throttling 424. If the hardware throttling 424 reduces the power below the PSU×1 W threshold 426, the system 100 can continue to operate in a throttled/clamped state until repairs/corrections can be made. If instead the hardware throttling 424 does not reduce the power below PSU×1 W 428, the system 100 can initiate a shutdown 430.

Next, consider the second/middle portion of the flow chart described above, where power consumption is hovering around PSU×1.2 W 410. When system power consumption is between PSU×1.2 W and PSU×1.35 W (e.g., 2970 W) 432, 434, 442, the BMC can start to power clamp despite having more than one operating power supply. Specifically, if the power consumption exceeds PSU×1.2 W 432, hardware throttling and/or processor clamping can be enabled, whereas if system power consumption is under PSU×1.2× 0.95 W (e.g., 2508 W), the clamping and/or hardware throttling can be disabled. Hardware and software clamping in this stage 434 can occur in an iterative manner 434, with the system 100 verifying current power consumption 438 before each subsequent decrease. If a PSU failure occurs in a power clamp period 440 (i.e., when processor power is already being reduced), the system 100 performs a hardware throttle which forces power consumption below PSU×1 W.

Finally, consider the right portion of the flow chart, where when system power consumption is higher than PSU×1.35 W 450, the system can immediately initiate a hardware throttling 452 and, if power increases 454 or fails to reduce below PSU×1.35 W, initiate a system shutdown 456. If the system power consumption drops, either from reduced power requirements 446 or hardware throttling 458, the system 100 can return to normal operations 406. Advantages of this system include a decrease in damage to power supply units and a decrease in system lag (response time to the need for additional power).

Figure 5:
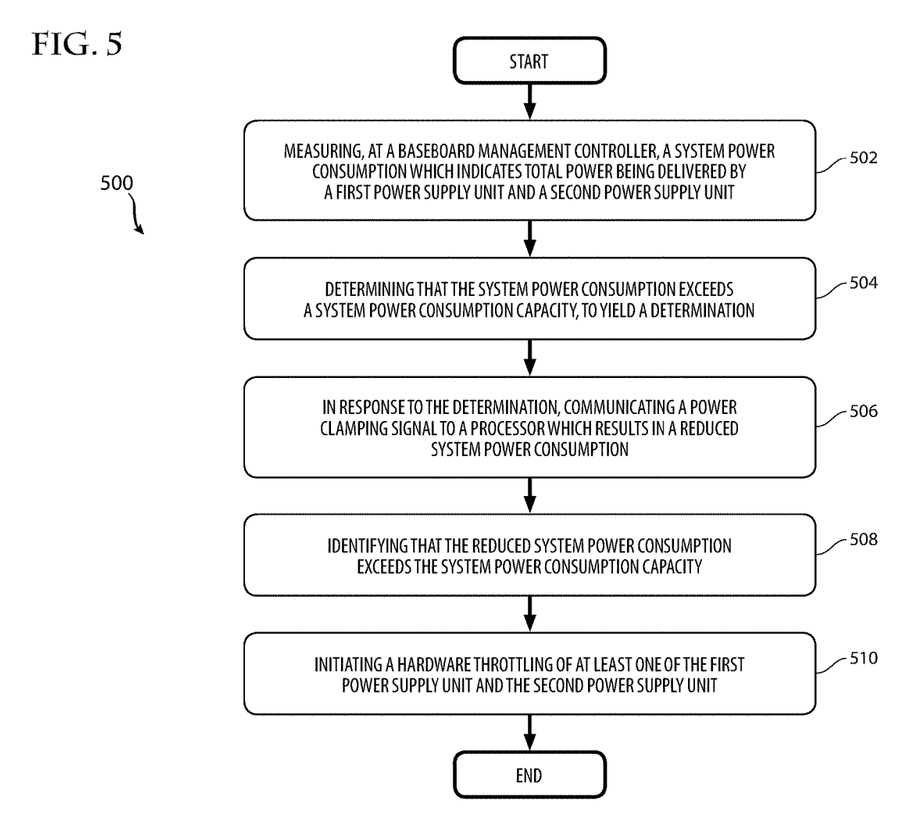
FIG. 5 illustrates an example method embodiment.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 measures, at a management controller, a system power consumption which indicates total power being delivered by a first power supply unit and a second power supply unit (502). The system 100 determines that the system power consumption exceeds a system power consumption capacity, to yield a determination (504), and, in response to the determination, communicates a power clamping signal to a processor (or multiple processors), which results in a reduced system power consumption (506). The system 100 identifies that the reduced system power consumption exceeds the system power consumption capacity (508) and initiates a hardware throttling of at least one of the first power supply unit and the second power supply unit (510). The disclosed method embodiment illustrated in FIG. 5 can, for example, be utilized to help manage power when the first power supply unit is operational and the second power supply unit has failed.

The determining the system power consumption exceeds the system power consumption can include a comparison of the system power consumption which is measured against a predetermined threshold. Communicating of the power clamping signal can cause iterative reductions in a processor power consumption of the processor (or multiple processors). Each iteration can have a designated time period (for example, 5 ms) to see if power consumption has dropped sufficiently. If the power consumption remains too high throughout the designated time period, the system 100 can further reduce the power through clamping (software) or throttling (hardware). Each iteration can cause a reduction of the processor power consumption by a predefined percentage of a maximum processor power consumption of the processor(s), and the iterations can end when the processor power consumption reaches a minimum processor power threshold. For example, if the processor power threshold were 50%, and the processor power reached 50% of capacity, the system 100 could initiate hardware throttling. When neither software nor hardware throttling place the system power consumption in an acceptable state, the system 100 can shutdown, meaning the system 100 can turn off the management controller, the processors (including CPUs and/or the BMC), the first power supply unit, and/or the second power supply unit when the minimum processor power threshold is reached and/or the hardware throttling when the power exceeds a minimum threshold.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to servers running multiple/redundant power supplies, or can be applied to any device running multiple power supplies. Various modifications and changes may be made to the principles described herein without following the example embodiments and applications illustrated and described herein, and without departing from the spirit and scope of the disclosure.

We claim:
1. A system comprising:
   a first power supply unit;
   a second power supply unit; and
   at least one processor which perform operations comprising:
      monitoring a system power consumption, wherein the system power consumption indicates a total power being delivered by the first power supply unit and the second power supply unit;
      determining the system power consumption exceeds a system power consumption capacity, to yield a determination;
      in response to the determination, performing a power clamping of power to the at least one processor, such that a processor power consumption of the at least one processor is reduced, to yield a reduced system power consumption; and identifying that the reduced system power consumption exceeds the system power consumption capacity; wherein a baseboard management controller performs, after the identifying that the reduced system power consumption exceeds the system power consumption capacity, a hardware throttling on at least one of the first power supply unit and the second power supply unit, and iteratively repeating reducing the processor power consumption, wherein each iteration of the reducing of the processor power consumption causes a reduction of the processor power consumption by a predefined percentage of a maximum processor power consumption.

2. The system of claim 1, wherein determining the system power consumption exceeds the system power consumption capacity comprises comparing the system power consumption with a predetermined threshold.

3. The system of claim 2, wherein the first power supply unit is operational while the second power supply unit has failed.

4. The system of claim 1, wherein iterative repeating reducing the processor power consumption ends when the processor power consumption reaches a minimum processor power threshold.

5. The system of claim 4, wherein the at least one processors perform additional operations comprising:
shutting the system down when the minimum processor power threshold is iteratively reached and the processor power consumption continues to exceed the system power consumption capacity.

6. A method comprising:
measuring a system power consumption which indicates total power being delivered by a first power supply unit and a second power supply unit;
determining that the system power consumption exceeds a system power consumption capacity, to yield a determination;
in response to the determination, communicating a power clamping signal to a processor which results in a reduced system power consumption, wherein the communicating of the power clamping signal causes iterative reductions in a processor power consumption of the processor, wherein each iteration causes a reduction of the processor power consumption by a predefined percentage of a maximum processor power consumption of the processor;
identifying that the reduced system power consumption exceeds the system power consumption capacity; and
initiating a hardware throttling of at least one of the first power supply unit and the second power supply unit.

7. The method of claim 6, wherein determining the system power consumption exceeds the system power consumption comprises a comparison of the system power consumption which is measured against a predetermined threshold.

8. The method of claim 7, wherein the first power supply unit is operational and the second power supply unit has failed.

9. The method of claim 6, wherein iterations end when the processor power consumption reaches a minimum processor power threshold.

10. The method of claim 9, further comprising shutting down by a baseboard management controller, the processor, the first power supply unit, and the second power supply unit when the minimum processor power threshold is reached.

11. A computer-readable storage device having instructions stored which, when executed by a management controller, cause the management controller to perform operations comprising:
measuring a system power consumption which indicates total power being delivered by a first power supply unit and a second power supply unit;
determining that the system power consumption exceeds a system power consumption capacity, to yield a determination;
in response to the determination, communicating a power clamping signal to a processor which results in a reduced system power consumption, wherein the communicating of the power clamping signal causes iterative reductions in a processor power consumption of the processor, wherein each iteration causes a reduction of the processor power consumption by a predefined percentage of a maximum processor power consumption of the processor;
identifying that the reduced system power consumption exceeds the system power consumption capacity; and
initiating a hardware throttling of at least one of the first power supply unit and the second power supply unit.

12. The computer-readable storage device of claim 11, wherein determining the system power consumption exceeds the system power consumption capacity comprises comparing the system power consumption with a predetermined threshold.

13. The computer-readable storage device of claim 11, wherein the first power supply unit is operational while the second power supply unit has failed.

14. The computer-readable storage device of claim 11, wherein iterations end when the processor power consumption reaches a minimum processor power threshold.

* * * * *